(12) United States Patent
Pfeifer, Jr. et al.

(10) Patent No.: US 9,225,739 B2
(45) Date of Patent: Dec. 29, 2015

(54) PROVIDING USER-SPECIFIC MALWARE ASSESSMENT BASED ON SOCIAL INTERACTIONS

(71) Applicant: Microsoft Corporation, Redmond, WA (US)

(72) Inventors: William Pfeifer, Jr., Redmond, WA (US); Nitin Sood, Redmond, WA (US); Joseph Carl Nelson Blackbird, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/928,253

(22) Filed: Jun. 26, 2013

(65) Prior Publication Data

US 2015/0007331 A1   Jan. 1, 2015

(51) Int. Cl.
*G06F 21/56* (2013.01)
*H04L 29/06* (2006.01)
*H04L 29/04* (2006.01)

(52) U.S. Cl.
CPC ........... *H04L 63/1433* (2013.01); *H04L 63/145* (2013.01); *H04L 63/1416* (2013.01)

(58) Field of Classification Search
CPC .............................. H04L 63/145; G06F 21/56
See application file for complete search history.

(56) References Cited

U.S. PATENT DOCUMENTS

2011/0161452 A1   6/2011   Poornachandran et al.
2012/0158851 A1*  6/2012   Kelmenson et al. .......... 709/205

FOREIGN PATENT DOCUMENTS

DE    EP 1990973 A2 * 11/2008 .......... H04L 63/1416
EP    2348440 A2    7/2011
EP    2515252 A2    10/2012

OTHER PUBLICATIONS

Malware Propagation in Online Social Networks: Nature, Dynamics and Defense Implications. Yan et al. ASIACCS(2011).*
Zhichao, Zhu, et al., "A Social Network Based Patching Scheme for Worm Containment in Cellular Networks", INFOCOM 2009, The 28th Conference on Computer Communications, IEEE, IEEE, Piscataway, NJ< USA, Apr. 2009, pp. 1476-1484.
Nam P Nguyen, et al., "A novel method for worm containment on dynamic social networks", Military Communications Conference, 2010—MILCOM 2010, IEEE, Piscataway, NJ, USA, Oct. 2010, pp. 2180-2185.

(Continued)

*Primary Examiner* — Venkat Perungavoor
(74) *Attorney, Agent, or Firm* — Timothy Churna; Sade Fashokun; Micky Minhas

(57) ABSTRACT

Embodiments are directed to determining a risk of encountering malware based on social context, to determining malware threats based on social associations and to ranking antimalware programs according to the program's ability to protect against specific threats. In one scenario, a computer system receives a malware notification associated with a user that identifies a type of malware encountered by the user. The computer system identifies various persons that are part of a social group associated with the user and determines that at least one of the identified persons associated with the user has an increased likelihood of encountering the identified type of malware, based on information derived from identifying the persons that are part of the social group. Optionally, the computer system notifies the identified persons of the increased likelihood of encountering the identified type of malware.

22 Claims, 5 Drawing Sheets

(56) References Cited

OTHER PUBLICATIONS

International Search Report & Written Opinion for PCT Patent Application No. PCT/US2014/043639, Mailed Date: Sep. 25, 2014, Filed Date: Jun. 23, 2014, 13 pages.

Yang, et al., "Enhancing Mobile Malware Detection with Social Collaboration", In IEEE International Conference on Privacy, Security, Risk, and Trust, and IEEE International Conference on Social Computing, Oct. 9, 2011, 5 pages.

Rahman, Sazzadur, "Detecting Social Malware and its Ecosystem in Online Social Networks", In UC Riverside Electronic Theses and Dissertations, Dec. 2012, 124 pages, Colajanni, et al., "Collaborative Architecture for Malware Detection and Analysis", In Proceedings of the International Information Security Conference, vol. 278, Sep. 7, 2008, 16 pages.

Rahman, et al., "Efficient and Scalable Socware Detection in Online Social Networks", In Proceedings of the 21st USENIX Conference on Security Symposium, Jun. 2012, 16 pages.

"The WebPulse Collaborative Defense", In White Paper of Blue Coat, Nov. 2011, 12 pages.

"Security for Social Networking", Retrieved on: Jun. 3, 2013, Available at: http://www.pwc.com/en_US/us/it-risk-security/assets/social-networking-final.pdf.

Cobb, Michael, "Social Networking Best Practices for Preventing Social Network Malware", Published on: Feb. 2011, Available at: http://searchsecurity.techtarget.com/answer/Social-networking-best-practices-for-preventing-social-network-malware.

"Second Written Opinion Issued in PCT Application No. PCT/US2014/043639", Mailed Date: May 27, 2015, 10 Pages.

"International Preliminary Report on Patentability Issued in PCT Patent Application No. PCT/US2014/043639", Mailed Date: Sep. 11, 2015, 11 Pages.

\* cited by examiner

PROVIDING USER-SPECIFIC MALWARE ASSESSMENT BASED ON SOCIAL INTERACTIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email. In some cases, software applications may be designed to prevent malware from infecting a computing system, or remove malware from an infected system. Such applications are typically referred to as "antimalware" applications.

BRIEF SUMMARY

Embodiments described herein are directed to determining a risk of encountering malware based on social context, to determining malware threats based on social associations and to ranking antimalware programs according to the program's ability to protect against specific threats. In one embodiment, a computer system receives a malware notification associated with a user. The malware notification identifies at least one type of malware encountered by the user. The computer system identifies various persons that are part of a social group associated with the user and determines that at least one of the identified persons associated with the user has an increased likelihood of encountering the identified type of malware, based on information derived from identifying the persons that are part of the social group. Optionally, the computer system then notifies at least one of the identified persons of the increased likelihood of encountering the identified type of malware.

In another embodiment, a computer system determines malware threats for users based on social associations. The computer system accesses data indicating communications made by a user to various other persons. The computer system generates a data structure representative of the user's communications, which includes an indication of the user's relationship with the other persons. The computer system further identifies, within the data structure, clusters of persons that have encountered at least one form of malware, and provides the user an indication of their likelihood of encountering malware, based on the user's interactions with the clusters of persons that have previously encountered malware.

In yet another embodiment, a computer system performs a method for ranking antimalware programs according to the program's ability to protect against user-specific threats. The computer system accesses information indicating clusters of persons that have encountered at least one form of malware, where the persons are associated with a user. The computer system determines, from the accessed information, which forms of malware the user is most likely to encounter, based on the user's interactions with the clusters of persons that have encountered malware. The computer system further identifies various antimalware applications based on which antimalware application optimally protects the user according to the determined forms of malware the user is most likely to encounter. The computer system may also rank the antimalware applications and present the ranked antimalware applications to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
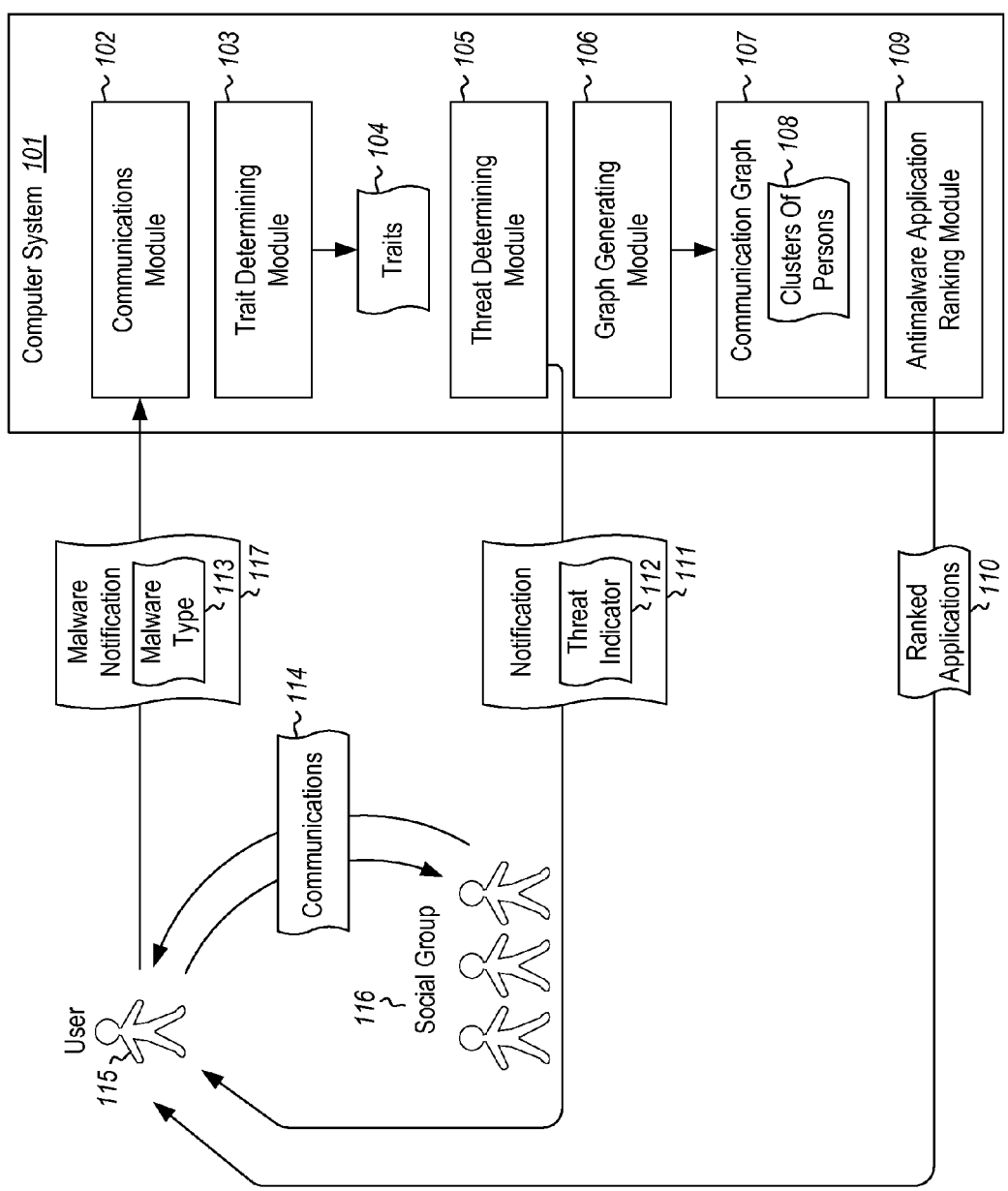
FIG. 1 illustrates a computer architecture in which embodiments described herein may operate including determining a risk of encountering malware based on social context.

Embodiments described herein are directed to determining a risk of encountering malware based on social context, to determining malware threats based on social associations and to ranking antimalware programs according to the program's ability to protect against specific threats. In one embodiment, a computer system receives a malware notification associated with a user. The malware notification identifies at least one type of malware encountered by the user. The computer system identifies various persons that are part of a social group associated with the user and determines that at least one of the identified persons associated with the user has an increased likelihood of encountering the identified type of malware, based on information derived from identifying the persons that are part of the social group. Optionally, the computer system then notifies at least one of the identified persons of the increased likelihood of encountering the identified type of malware.

In another embodiment, a computer system determines malware threats for users based on social associations. The computer system accesses data indicating communications made by a user to various other persons. The computer system generates a data structure representative of the user's communications, which includes an indication of the user's relationship with the other persons. The computer system further identifies, within the data structure, clusters of persons that have encountered at least one form of malware, and provides the user an indication of their likelihood of encountering malware, based on the user's interactions with the clusters of persons that have previously encountered malware.

In yet another embodiment, a computer system performs a method for ranking antimalware programs according to the program's ability to protect against user-specific threats. The computer system accesses information indicating clusters of persons that have encountered at least one form of malware, where the persons are associated with a user. The computer system determines, from the accessed information, which forms of malware the user is most likely to encounter, based on the user's interactions with the clusters of persons that have encountered malware. The computer system further identifies various antimalware applications based on which antimalware application optimally protects the user according to the determined forms of malware the user is most likely to encounter. The computer system may also rank the antimalware applications and present the ranked antimalware applications to the user.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, single- or multi-processor systems having hardware processors, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, communications module 102 may be configured to send and receive data communications including malware notification 117. The malware notification 117 may include an indication of a type of malware 113 encountered by the user 115.

The user 115 may be any type of user, and may be a member of (or interact with) various social groups including social group 116. The social group 116 may be any type of organization or grouping of people including the user's friends, work organizations (including organizational charts), web communities or even people with whom the user has recently begun communicating. It should be noted that when referring to "users" or "persons" herein, the user's or person's computer system is also included, either explicitly or implicitly. Thus, if a user or person is described as performing a function such as sending or receiving data, it will be understood that the user's or person's computing system is sending or receiving data. Moreover, it should be understood that when referring to a computer system performing a function (such as sending or receiving data), the computer system may perform the function using any combination of hardware and/or software, including any of the hardware or software components illustrated in FIG. 1.

The computer system 101 of FIG. 1 may also include a trait determining module 103, which may be configured to determine traits 104 of the malware indicated in the notification 117. The malware traits may include any type of information related to the type of malware including, but not limited to, how the malware is propagated, what the malware does when installed, how to uninstall the malware, or other information.

Using this trait information, the threat determining module 105 may determine whether the malware is likely to infect others in the user's social group(s) 116. For instance, if the user regularly interacts with certain users by exchanging email, and the malware is typically spread via links or attachments in email, those members of the user's social group may be more likely to be infected by the malware encountered by the user 113. Or, on the other hand, the user 115 may be more likely to encounter malware that has been encountered by members of the user's social group 116.

In some embodiments, the computer system 101 may have access to large portions of data that is available in social networks. These social network may be formal networks of friends, family and acquaintances, or may be informal groups (such as groups of people to which the user sends email messages). In some cases, the user may opt in to services provided by the computer system 101 to help keep their computer system and those of their friends clean from malware infections. In such cases, the computer system 101 may monitor the user's interactions with others in their social group.

Based on these interactions, the graph generating module 106 may generate a data structure such as communication graph 107. The graph (or other data structure) is representative of the user's interactions with other persons (e.g. clusters of persons 108). While such data structures are often referred to herein as "graphs" or "communication graphs", it should be noted that substantially any type of structure designed to organize and/or present information may be generated, including graphs, charts, lists spreadsheets or other data structures. The graphs may depict a user's interactions with other users, including interacting by sending email messages, text messages, mass communications sent to subscribers, posting pictures, initiating phone conversations, video or audio chat conversations, or interacting with the user in any other way.

Using these communication interrelationships between users, the computer system 101 can predict potential malware infections among users of the various social groups (e.g. 116). Moreover, the computer system 101 can help prevent potential infections by offering users antimalware solutions that are best suited for their risks. Accordingly, various embodiments will be described which determine a user's risk of infection based on social context and malware properties, determine a user's entire threat landscape via their social associations, and generate a list of antimalware solutions ranked by their ability to protect against the user's specific risks. These concepts will be explained further below with regard to methods 200, 300 and 400 of FIGS. 2, 3 and 4, respectively.

Figure 2:
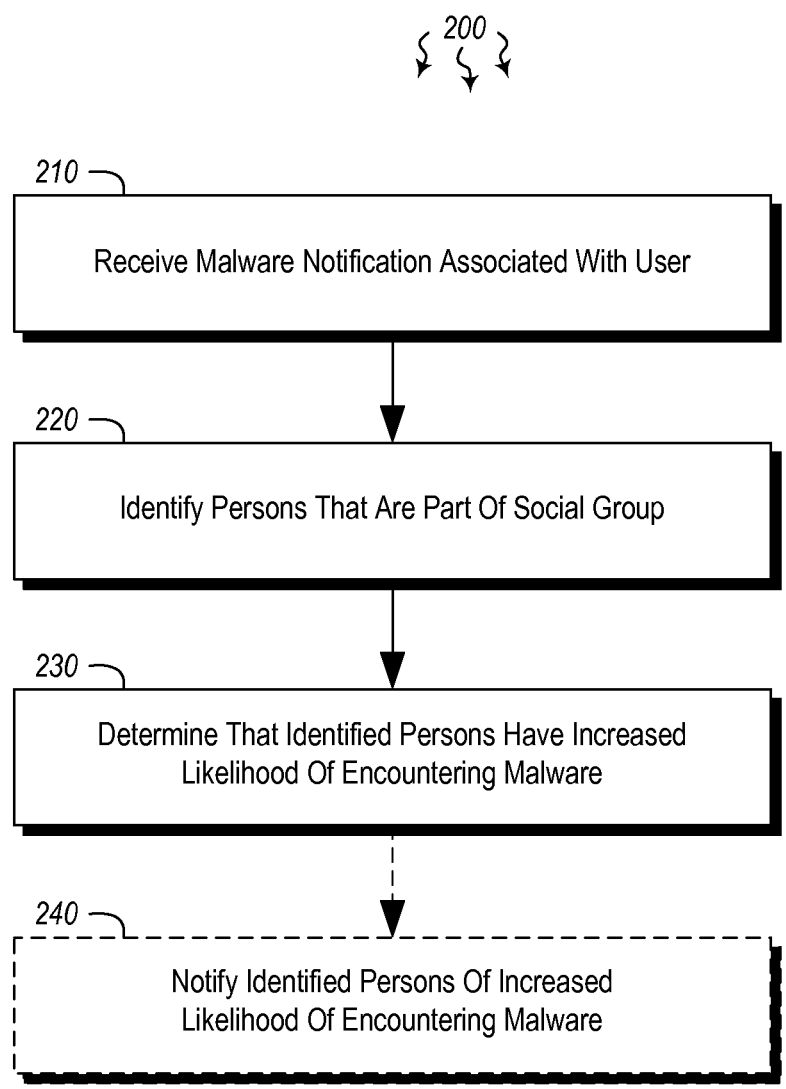
FIG. 2 illustrates a flowchart of an example method for determining a risk of encountering malware based on social context.
Figure 3:
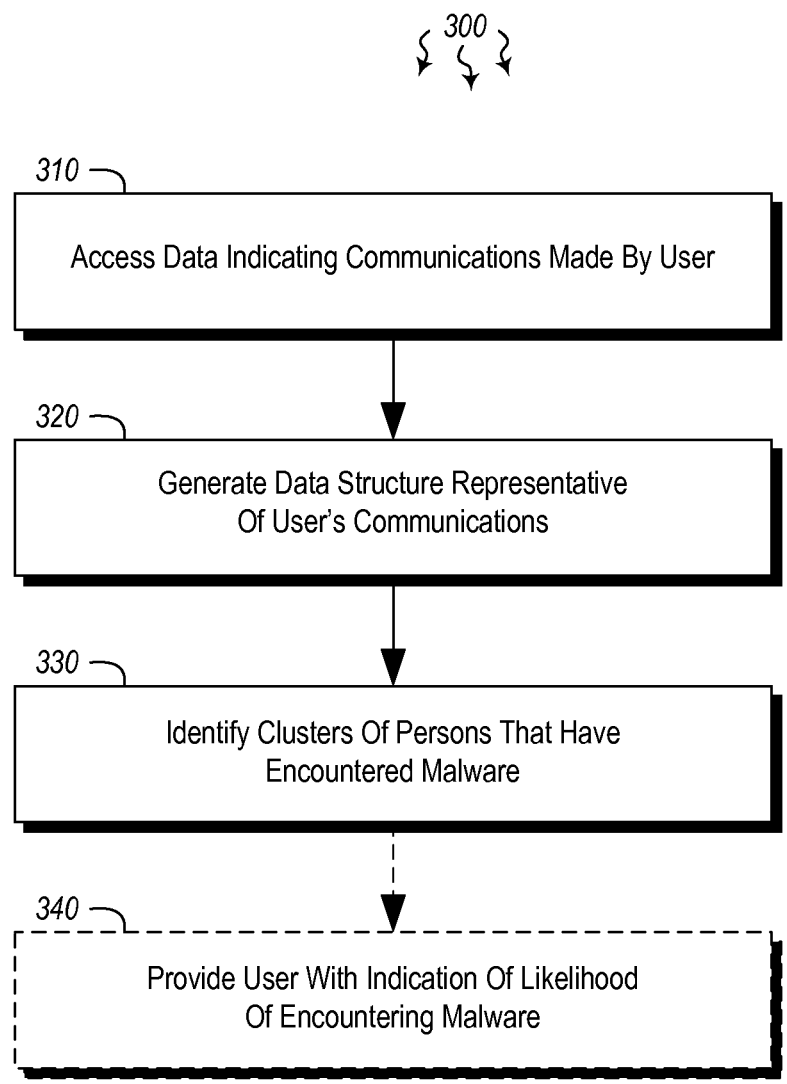
FIG. 3 illustrates a flowchart of an example method for determining malware threats based on social associations.
Figure 4:
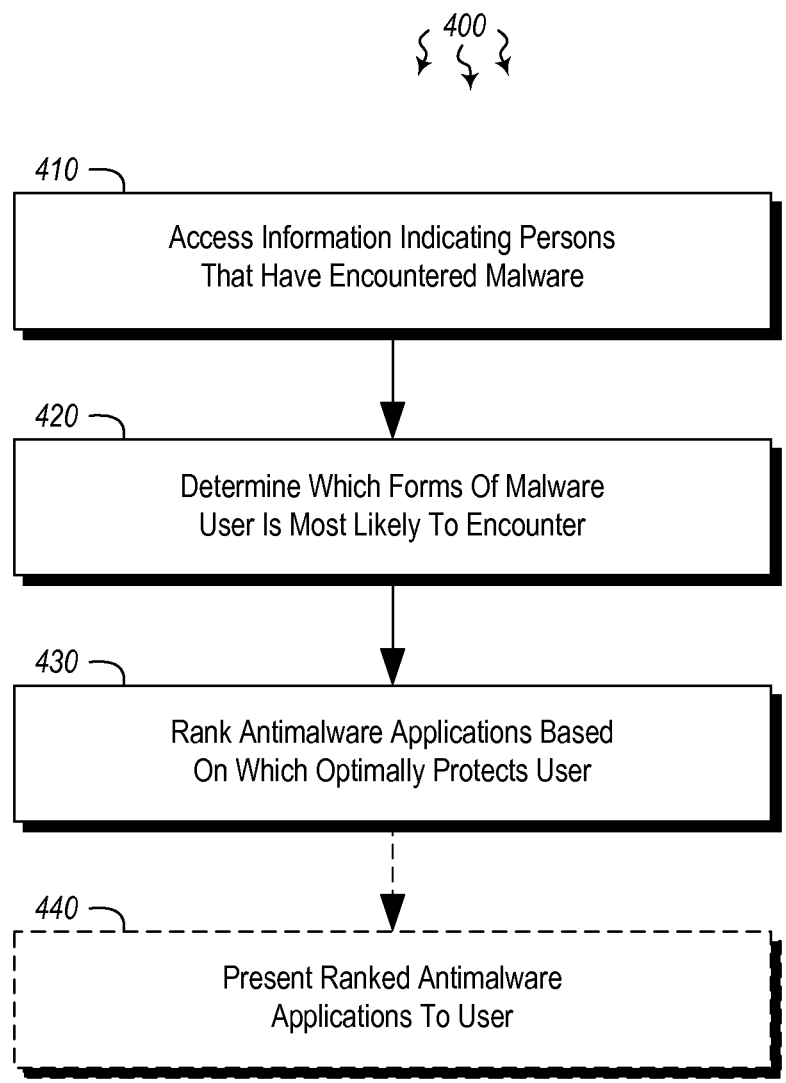
FIG. 4 illustrates a flowchart of an example method for ranking antimalware programs according to the program's ability to protect against specific threats.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining a risk of encountering malware based on social context. The method 200 will now be described with frequent reference to the components and data of environment 100.

Method 200 includes an act of receiving a malware notification associated with a user, the malware notification identifying at least one type of malware encountered by the user (act 210). For example, communications module 102 of computer system 101 may receive malware notification 117 from user 115. The malware notification 117 includes an indication of one or more types of malware 115 that the user has encountered at some point in the past. The malware may be any type of malware including viruses, trojans, worms, adware, key loggers or other forms of malware. The indication of malware type 113 may include one or more specific details about each type of malware encountered by the user.

The trait determining module 103 is configured to determine various traits associated with the type of malware 113 specified by the user 115. The traits may include information including indications of how the malware is propagated between users. For instance, the malware may be propagated through email attachments or links, through infected application installation files, through infected websites or through other means of propagation. In some cases, the malware traits 104 indicate where the malware originated from (i.e. what user or member of social group 116 the malware was received from).

Method 200 further includes an act of identifying one or more persons that are part of a social group associated with the user (act 220). The computer system 101 may identify the members in user 115's social group (whether it is a formal group or an informal group) by looking at the user's interactions with those social group members. The computer system may then determine that at least one of the identified persons associated with the user has an increased likelihood of encountering the identified type of malware, based on information derived from identifying the persons that are part of the social group (act 230), and, in an optional act, may further notify at least one of the identified persons of the increased likelihood of encountering the identified type of malware (act 240). Thus, for example, if the user 115 has provided a link to a website that is known to carry the specified virus or malware, any social group member to whom the user has provided the link would be at an increased risk for contracting the virus. The notification 111 may be sent to one or more of the social group members, and may include a threat indicator 112 that indicates the specific threat to that user, based on that user's interactions with user 115.

For instance, if a user interacts with a group member in a certain manner, and a particular piece of malware is known to spread through that type of interaction, that user will be more likely to contract that piece of malware. For example, a user may interact with other social group members in a variety of different manners including, but not limited to, sending or receiving email messages, sending or receiving text messages, sending or receiving social media notifications or other mass messages (sent to subscribers or the public at large), sending or receiving messages that include a uniform resource locator (URL) or other uniform resource identifier (URI), and sending or receiving messages that include attachments.

Thus, for example, if a user receives a text or email message with a URL from the social group, and a particular piece of malware is known to propagate using messages with a URL, the user will be notified as being of higher risk to contract that piece of malware, especially if one or more member of the social group have encountered it before. Thus, based on the user's interactions with other users, the user may become more or less likely to encounter certain types of malware. Indeed, at least in some cases, a user's likelihood of encountering a specified type of malware may increase in proportion to the number of interactions the user has with other members of the social group.

Additionally or alternatively, a user's likelihood of exposure to a particular piece of malware may be based on other factors that are part of the user's social context. For instance, a user's likelihood of encountering malware may be increased or decreased based on other similarities with the persons in the user's social group. In one cases, the user's likelihood of encountering a particular piece of malware may be increased by having the same type of computing device as another member of the social group (especially one that has previously encountered malware). Further similarities may include users and social group members using the same (or similar) types of software, the same or similar applications, the same services, accounts, memberships to organizations, levels of web or intranet access, or a variety of other factors. Any or all of these similarities, individual or collectively, may increase or decrease the user's likelihood of encountering certain types of malware. This information, accordingly, may be used in determining the user's likelihood of encountering malware.

In some case, the notification 111 is only sent to those identified persons who have opted in to receive notifications. Thus, social group members that want to be apprised of potential increased risks of encountering malware may opt in and receive these notifications periodically. The notifications include an indication of the specific threats to that user, based on what, for example, user 115 has shared with that user. If the user was previously notified of the identified malware threat, then the computer system 101 prevents additional notifications from being sent to that person. The notification may further include information about the identified type of malware. The amount of information may be variable based on preferences established by the identified person. For example, if the user is a more advanced computer user, they may wish to receive a larger amount of information about the malware, while a less experienced user may wish to receive less information.

In some embodiments, the computer system 101 may determine whether at least one of the identified persons in social group 116 has antimalware software installed. If the person does have antimalware software installed on their computer system, the computer system 101 may initiate an antimalware scan on that user's computer system. The antimalware scan may be performed silently so that the identified person is unaware that the scan is taking place. In other cases, the computer system 101 may determine whether the identified person's antimalware software is up to date. If it is not up to date, the antimalware software may be updated before running the antimalware scan.

In still other embodiments, the computer system 101 may determine whether at least one of the identified persons has antimalware software on the person's computer system and, upon determining that the identified person has antimalware software on their computer system, may further determine whether the antimalware software is able to identify the specified type of malware 113. If the identified person's antimalware software is not able to identify the specified type of malware, the computer system 101 may present the identified person a selection of available antimalware software applications that are able to identify the specified type of malware. That person may then view the presentation and decide which antimalware application to download and install.

If computer system 101 determines that the identified person's antimalware software is expired, it may present to the identified person an option to renew their antimalware subscription or provide an offer for various free antimalware applications that can prevent and/or remove the specified malware type 113. The computer system 101 may also be configured to identify which person in the social group first encountered the specified type of malware and determine a specific threat level for each member of the social group 116, based on those member's interactions with the person that first encountered the malware.

FIG. 3 illustrates a flowchart of a method 300 for determining malware threats for users based on social associations. The method 300 will now be described with frequent reference to the components and data of environment 100.

Method 300 includes an act of accessing data indicating one or more communications made by a user to one or more other persons (act 310). For example, computer system 101 may access metadata or other information that indicates the user's interaction with other social groups 116. In some cases, the information about the user's communications may only be gathered for users that have opted in to allow the computer system 101 to collect their communication information in order to prevent the spread of malware within their social group. The graph generating module 106 then generates a data structure such as graph 107 which represents the user's communications (act 320). The graph (or other data structure) includes an indication of the user's relationship with the one or more other persons. This relationship may indicate that the user interacts often with a person, or rarely, and may further indicate the types of communications 114 exchanged between the users.

Method 300 next includes an act of identifying, within the graph (or other data structure), one or more clusters of persons that have encountered at least one form of malware (act 330). For example, the computer system 101 may identify clusters of persons 108 that have encountered malware. Optionally, the computer system 101 may then provide the user 115 an indication of their likelihood of encountering malware, based on the user's interactions with the clusters of persons that have previously encountered malware (act 340). For instance, if the user has had a large amount of interaction with the identified clusters of persons 108, the user may have a higher likelihood of contracting a virus or other malware. Conversely, if the user has had a low amount of interaction with those identified users that have encountered malware, the user would have a lower likelihood of being infected by that type of malware.

The computer system 101 may further determine, within a specified cluster of persons 108, which specific persons have encountered a specific form of malware. The indication sent to the user indicating their likelihood of encountering malware would then be increased by a specified percentage due to the user's participation in the identified social group. The computer system 101 may also be configured to access the user's past communications with various persons in the generated graph 107 and, based on the past communications, may adjust the indication of likelihood that the user will encounter malware. For instance, if the malware spreads via email, the threat determining module 105 of the computer system 101 may access email metadata for previous email communications between the user 115 and the identified cluster of persons 108. If a substantial amount of email has been exchanged between the user and the cluster of persons, the user's likelihood of being infected is correspondingly higher.

Figure 5:
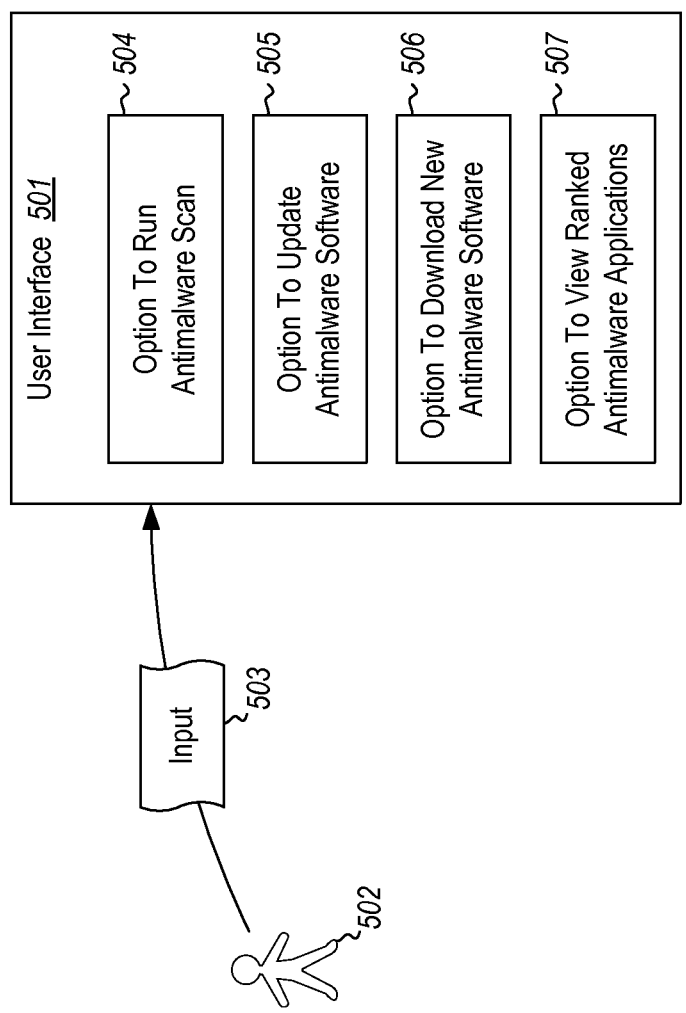
FIG. 5 illustrates example options that may be presented to a user in a user interface.

The computer system 101 may further be configured to perform a scan of the user's social network 116 to determine which users in the social network have encountered malware (as an aggregate) and may determine that the user's risk levels have increased or decreased based on the social network scan. If the user's risk level is sufficiently high, the user may be prompted with various options, as shown in FIG. 5. For instance, in user interface 501, the user 502 may be given the option to run an antimalware scan 504 on their computer system. Additionally or alternatively, the user may be given the option to update their antimalware software 505 (if it is out of date), or an option to download a new antimalware application 506, or an option to view ranked antimalware applications 507 (as will be explained below with regard to method 400 of FIG. 4). The user may select any of the above options using input 403 to confirm their selection.

FIG. 4 illustrates a flowchart of a method 400 for ranking antimalware programs according to the program's ability to protect against user-specific threats. The method 400 will now be described with frequent reference to the components and data of environment 100.

Method 400 includes an act of accessing information indicating one or more clusters of persons that have encountered at least one form of malware, the persons being associated with a user (act 410). Method 400 next includes an act of determining, from the accessed information, which one or more forms of malware the user is most likely to encounter, based on the user's interactions with the clusters of persons that have encountered malware (act 420). Method 400 further includes an act of identifying one or more antimalware applications based on which antimalware application optimally protects the user according to the determined forms of malware the user is most likely to encounter (act 430), and, optionally, an act of presenting the ranked antimalware applications to the user (act 440).

For instance, antimalware application ranking module 109 may identify which antimalware applications can prevent and/or remove the malware threat 113 specified by the user. The antimalware applications may then be ranked according to price, effectiveness, general reputation or other factors. The indication of ranked applications 110 may be sent to the user 115 to inform the user of which antimalware software would be best for the user's current situation (i.e. best based on the user's interaction with other social group users that have encountered malware). In some cases, the user 115 may specify that antimalware updates are to be applied automatically. In such cases, the computer system 110 may silently and automatically install the highest ranked antimalware application that is able to protect the user 115 against the determined forms of malware. Then, once installed, it may initiate an antimalware scan using the automatically installed antimalware application.

Accordingly, methods, systems and computer program products are provided which determine a user's risk of encountering malware based on social context. Moreover, methods, systems and computer program products are provided which determine malware threats for users based on social associations and rank antimalware programs according to the program's ability to protect against user-specific threats.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:
1. A computer system comprising the following:
one or more processors;
system memory; and
one or more computer-readable storage media having stored thereon computer-executable instructions that, when executed by the one or more processors, causes the computing system to perform a method for determining a risk of encountering malware based on social context, the method comprising:

receiving a malware notification associated with a user, the malware notification identifying at least one type of malware encountered by the user, the malware being a computer malware that is capable of infecting a computing system;

determining one or more traits of the identified type of malware;

identifying one or more persons that are part of a social group associated with the user;

determining a likelihood that the malware may infect or has infected the identified one or more persons, the determining being based on the traits of the identified type of malware; and determining whether at least one of the identified persons associated with the user has an increased likelihood of encountering the identified type of malware based at least on information derived from the identifying.

2. The computer system of claim 1, the method further comprising:

notifying at least one of the identified persons of the increased likelihood of encountering the identified type of malware.

3. The computer system of claim 1, wherein the at least one of the traits indicate how the malware is propagated.

4. The computer system of claim 1, the method further comprising determining a specific threat level to one or more of the identified persons, the specific threat level being based on the traits of the identified type of malware.

5. The computer system of claim 1, the method further comprising:

determining whether at least one of the identified persons has antimalware software associated with the person's computer system;

in response to determining that the identified person has antimalware software associated with their computer system, determining whether the antimalware software is configured to identify the specified type of malware; and in response to determining that the identified person's antimalware software is not configured to identify the specified type of malware, presenting to the identified person a selection of one or more available antimalware software applications that are configured to identify the specified type of malware.

6. The computer system of claim 1, wherein the identified persons' interactions with the user include at least one of the following: receiving an email message from the user, receiving a text message from the user, receiving a social media notification from the user, receiving a message that includes a uniform resource locators (URL), and receiving a message that includes an attachment.

7. The computer system of claim 6, wherein the identified person's likelihood of encountering the identified type of malware is increased in proportion to the number of interactions with the user.

8. The computer system of claim 1, wherein only those identified persons who have opted in to receive notifications are notified of the increased likelihood of encountering the identified type of malware.

9. The computer system of claim 1, the method further comprising:

determining whether at least one of the identified persons has been previously notified of the identified malware threat; and in response to determining that at least one of the identified persons has been previously notified of the identified malware threat, preventing additional notifications from being sent to that identified person.

10. The computer system of claim 1, wherein a specified amount of information about the identified type of malware is presented in the notification, the amount being variable based on preferences established by the identified person.

11. The computer system of claim 1, the method further comprising:

identifying which person in the social group first encountered the specified type of malware; and determining a specific threat level for at least one of the social group members, based on that member's interactions with the person that first encountered the specified type of malware.

12. A computer program product for implementing a method for determining a risk of encountering malware based on social context, the computer program product comprising one or more computer-readable storage media having stored thereon computer-executable instructions that, when executed by one or more processors of the computing system, cause the computing system to perform the method, the method comprising:

receiving a malware notification associated with a user, the malware notification identifying at least one type of malware encountered by the user, the malware being a computer malware that is capable of infecting a computing system;

determining one or more traits of the identified type of malware, at least one of the traits indicating how the malware is propagated;

identifying one or more persons that are part of a social group associated with the user;

determining a likelihood that the malware may infect or has infected the identified one or more persons, the determining being based on the traits of the identified type of malware; and determining whether at least one of the identified persons associated with the user has an increased likelihood of encountering the identified type of malware based on information derived from the identifying.

13. The computer program product of claim 12, the method further comprising:

accessing data indicating one or more communications made by the user to one or more of the identified persons;

generating a data structure representative of the user's communications, the data structure further including an indication of the user's relationship with the one or more identified persons;

identifying, within the data structure, one or more clusters of persons that have encountered at least one form of malware; and providing the user an indication of their likelihood of encountering malware based on the user's interactions with the clusters of persons that have previously encountered malware.

14. The computer program product of claim 13, wherein the indication of the user's likelihood of encountering malware is increased by a specified percentage due to the user's participation in an identified social group.

15. The computer program product of claim 13, the method further comprising:
   accessing one or more of the user's past communications with one or more persons in the generated data structure; and
   based on the past communications, adjusting the indication of likelihood that the user will encounter malware.

16. The computer program product of claim 15, wherein accessing past communications comprises accessing email metadata for one or more previous email communications.

17. The computer program product of claim 13, the method further comprising:
   performing a scan of the user's social network to determine which users in the social network have encountered malware; and
   determining whether the user's risk levels have increased or decreased based on the social network scan.

18. A computer system comprising the following:
   one or more processors;
   system memory; and
   one or more computer-readable storage media having stored thereon computer-executable instructions that, when executed by the one or more processors, causes the computing system to perform a method for ranking antimalware programs according to the program's ability to protect against user-specific threats, the method comprising:
      accessing information indicating one or more clusters of persons that have encountered at least one form of malware comprising a computer malware that is capable of infecting a computing system, the persons being associated with a user;
      determining, from the accessed information, which one or more forms of malware the user is most likely to encounter based on the user's interactions with the clusters of persons that have encountered malware; and
      identifying one or more antimalware applications based on which antimalware application optimally protects the user according to the determined forms of malware the user is most likely to encounter.

19. The computer system of claim 18, wherein the identified antimalware applications are ranked based on which antimalware application optimally protects the user according to the determined forms of malware the user is most likely to encounter.

20. The computer system of claim 18, the method further comprising:
   determining that the user has allowed antimalware software updates to be applied automatically;
   silently and automatically installing the highest ranked antimalware application that is able to protect the user against the determined forms of malware; and
   initiating an antimalware scan using the automatically installed antimalware application.

21. The computer system of claim 1, wherein the malware comprises at least one of a computer virus, trojan, worm, adware, or key logger.

22. A computer system comprising the following:
   one or more processors;
   system memory; and
   one or more computer-readable storage media having stored thereon computer-executable instructions that, when executed by the one or more processors, causes the computing system to perform a method for determining a risk of encountering malware based on social context, the method comprising:
      receiving a malware notification associated with a user, the malware notification identifying at least one type of malware encountered by the user, the malware being a computer malware that is capable of infecting a computing system;
      identifying one or more persons that are part of a social group associated with the user, wherein a specified amount of information about the identified type of malware is presented in the notification, the amount being variable based on preferences established by the identified person; and
      determining whether at least one of the identified persons associated with the user has an increased likelihood of encountering the identified type of malware based at least on information derived from the identifying.

* * * * *